(12) United States Patent
Chen et al.

(10) Patent No.: US 12,245,306 B2
(45) Date of Patent: *Mar. 4, 2025

(54) DETECTION AND HANDLING OF FAILURE ON USER PLANE PATH

(71) Applicant: Telefonaktiebolaget LM Ericsson (publ), Stockholm (SE)

(72) Inventors: Qian Chen, Mölndal (SE); Juying Gan, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,046

(22) Filed: May 16, 2023

(65) Prior Publication Data
US 2023/0284311 A1    Sep. 7, 2023

Related U.S. Application Data

(63) Continuation of application No. 16/976,871, filed as application No. PCT/CN2019/079612 on Mar. 26, 2019, now Pat. No. 11,659,611.

(30) Foreign Application Priority Data

Mar. 26, 2018 (WO) ................ PCT/CN2018/080536

(51) Int. Cl.
  *H04W 76/18* (2018.01)
  *H04W 84/04* (2009.01)
  (Continued)

(52) U.S. Cl.
  CPC .......... *H04W 76/18* (2018.02); *H04W 84/042* (2013.01); *H04W 92/045* (2013.01); *H04W 92/24* (2013.01)

(58) Field of Classification Search
  CPC ...... H04L 45/28; H04W 24/04; H04W 76/18; H04W 76/19; H04W 92/045; H04W 92/24
  See application file for complete search history.

(56) References Cited

U.S. PATENT DOCUMENTS 9,838,247 B2   12/2017   Liu
10,979,285 B2   4/2021   Yin et al.
(Continued)

FOREIGN PATENT DOCUMENTS

JP    2014506054 A    3/2014
JP    2018501712 A    1/2018
WO    2017148530 A1   9/2017

OTHER PUBLICATIONS

ETSI, "Digital cellular telecommunications system (Phase 2+) (GSM); Universal Mobile Telecommunications System (UMTS); LTE; Restoration procedures" Technical Specification, TS 23.007 version 14.4.0 Release 14, pp. 1-10, Jan. 2018, 3GPP.
(Continued)

*Primary Examiner* — Pao Sinkantarakorn
(74) *Attorney, Agent, or Firm* — COATS & BENNETT, PLLC (57) ABSTRACT

The present disclosure proposes a method of an endpoint of a user plane path between an access network and a core network in a telecommunication network, comprising: detecting whether a failure exists on the user plane path or not; and notifying a node in the core network of the failure in order for the node to handle the failure, upon detecting the failure. With this method, the failure can be handled timely, thus minimizing the service interruption.

17 Claims, 9 Drawing Sheets

(51) Int. Cl.
*H04W 92/04* (2009.01)
*H04W 92/24* (2009.01)

(56) References Cited

U.S. PATENT DOCUMENTS

| | | | | |
|---|---|---|---|---|
| 2013/0242754 A1* | 9/2013 | Shaikh | ............... | H04W 24/04 370/242 |
| 2013/0286821 A1 | 10/2013 | Liu | | |
| 2014/0204909 A1 | 7/2014 | Cheng et al. | | |
| 2015/0124585 A1* | 5/2015 | Sahin | ............... | H04W 36/12 370/218 |
| 2015/0163090 A1 | 6/2015 | Tsubouchi | | |
| 2016/0165642 A1 | 6/2016 | Lundén et al. | | |
| 2016/0269224 A1 | 9/2016 | Liu | | |
| 2017/0230877 A1* | 8/2017 | Claassen | ........... | H04W 36/0016 |
| 2017/0280501 A1 | 9/2017 | Xu et al. | | |
| 2018/0206275 A1* | 7/2018 | Jain | ............... | H04L 12/56 |
| 2018/0316522 A1 | 11/2018 | Chen et al. | | |
| 2020/0015079 A1 | 1/2020 | Li et al. | | |

OTHER PUBLICATIONS

3RD Generation Partnership Project, "3rd Generation Partnership Project; Technical Specification Group Services and System Aspects; Procedures for the 5G System; Stage 2 (Release 15)", Technical Specification, 3GPP TS 23.502 V15.1.0, 2018-03, pp. 1-285, 3GPP.
3rd Generation Partnership Project, "3rd Generation Partnership Project; Technical Specification Group Services and System Aspects; System Architecture for the 5G System; Stage 2 (Release 15)", Technical Specification, 3GPP TS 23.501 V15.1.0, Mar. 2018, pp. 1-201, 3GPP.
3rd Generation Partnership Project, "3rd Generation Partnership Project; Technical Specification Group Core Network and Terminals; Interface Between the Control Plane and the User Plane Nodes; Stage 3 (Release 15)", Technical Specification, 3GPP TS 29.244 V15.0.0, Dec. 2017, pp. 1-157, 3GPP.
3rd Generation Partnership Project, "3rd Generation Partnership Project; Technical Specification Group Core Network and Terminals; Restoration Procedures (Release 14)", Technical Specification, 3GPP TS 23.007 V14.4.0, Dec. 2017, pp. 1-105, 3GPP.
3rd Generation Partnership Project, "3rd Generation Partnership Project; Technical Specification Group Core Network and Terminals; General Packet Radio System (GPRS) Tunnelling Protocol User Plane (GTPv1-U) (Release 15)", Technical Specification, 3GPP TS 29.281 V15.1.0, Dec. 2017, pp. 1-30, 3GPP.
3rd Generation Partnership Project, "3rd Generation Partnership Project; Technical Specification Group Radio Access Network; Evolved Universal Terrestrial Radio Access Network (E-UTRAN); S1 Application Protocol (S1AP) (Release 14)", Technical Specification, 3GPP TS 36.413 V14.4.0, 2017-09, pp. 1-353, 3GPP.
3rd Generation Partnership Project, "3rd Generation Partnership Project; Technical Specification Group Services and System Aspects; General Packet Radio Service (GPRS) Enhancements for Evolved Universal Terrestrial Radio Access Network (E-UTRAN) Access (Release 15)", Technical Specification, 3GPP TS 23.401 V15.3.0, Mar. 2018, pp. 1-405, 3GPP.
Alcatel-Lucent et al., "GTP-U Tunneling Over S11", 3GPP TSG CT4 Meeting #72, Jeju, Korea, Feb. 15, 2016-Feb. 19, 2016, pp. 1-5, C4-161144, 3GPP.
Samsung, "GTP-U Error Indication Handling for the Connected UE", 3 GPP TSG SA WG2 Meeting #84, Bratislava, Slovakia, Apr. 11, 2011-Apr. 15, 2011, pp. 1-2, S2-111527, 3GPP.
Huawei et al., "TS 23.502: Proposal of N4 node level procedures", SA WG2 Meeting #124, Reno, USA, Nov. 27, 2017-Dec. 1, 2017, pp. 1-3, S2-179352, 3GPP.
ETSI, "Digital cellular telecommunications system (Phase 2+) (GSM); Universal Mobile Telecommunications System (UMTS); LTE; Restoration procedures (3GPP TS 23.007 version 14.40 Release 14)", Technical Specification, TS 123 007, V14.4.0, pp. 1-10, Jan. 2018, ETSI.

* cited by examiner

DETECTION AND HANDLING OF FAILURE ON USER PLANE PATH

RELATED APPLICATIONS

The present application is a continuation of U.S. patent application Ser. No. 16/976,871, which was filed on Aug. 31, 2020, which is a national stage application of PCT/CN2019/079612, which was filed Mar. 26, 2019, and claims priority to PCT/CN2018/080536, which was filed Mar. 26, 2018, the disclosures of each of which are incorporated herein by reference in their entirety.

TECHNICAL FIELD

The present disclosure relates to the technical field of a telecommunication network including an access network and a core network, particularly to methods and nodes for improving detection and handling of failure on user plane path between the access network and the core network.

BACKGROUND

Figure 1:
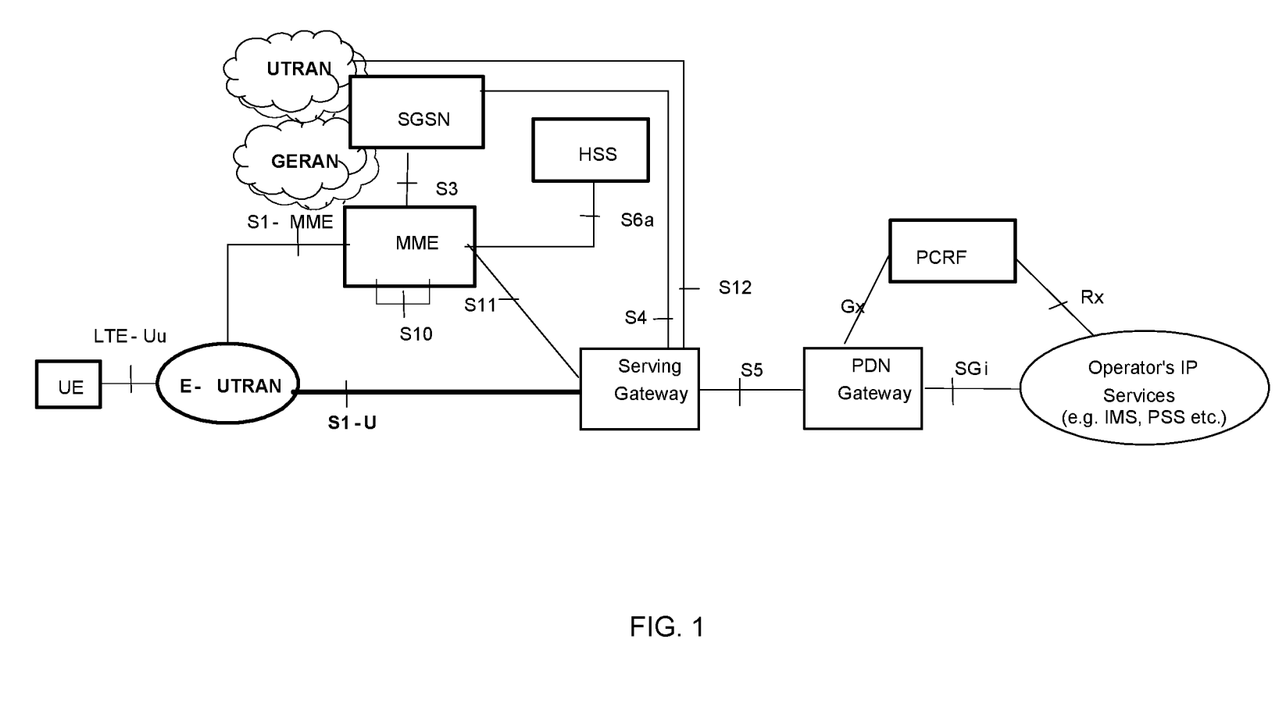
FIG. 1 schematically illustrates the non-roaming architecture for 3GPP accesses of the EPS.
Figure 2:
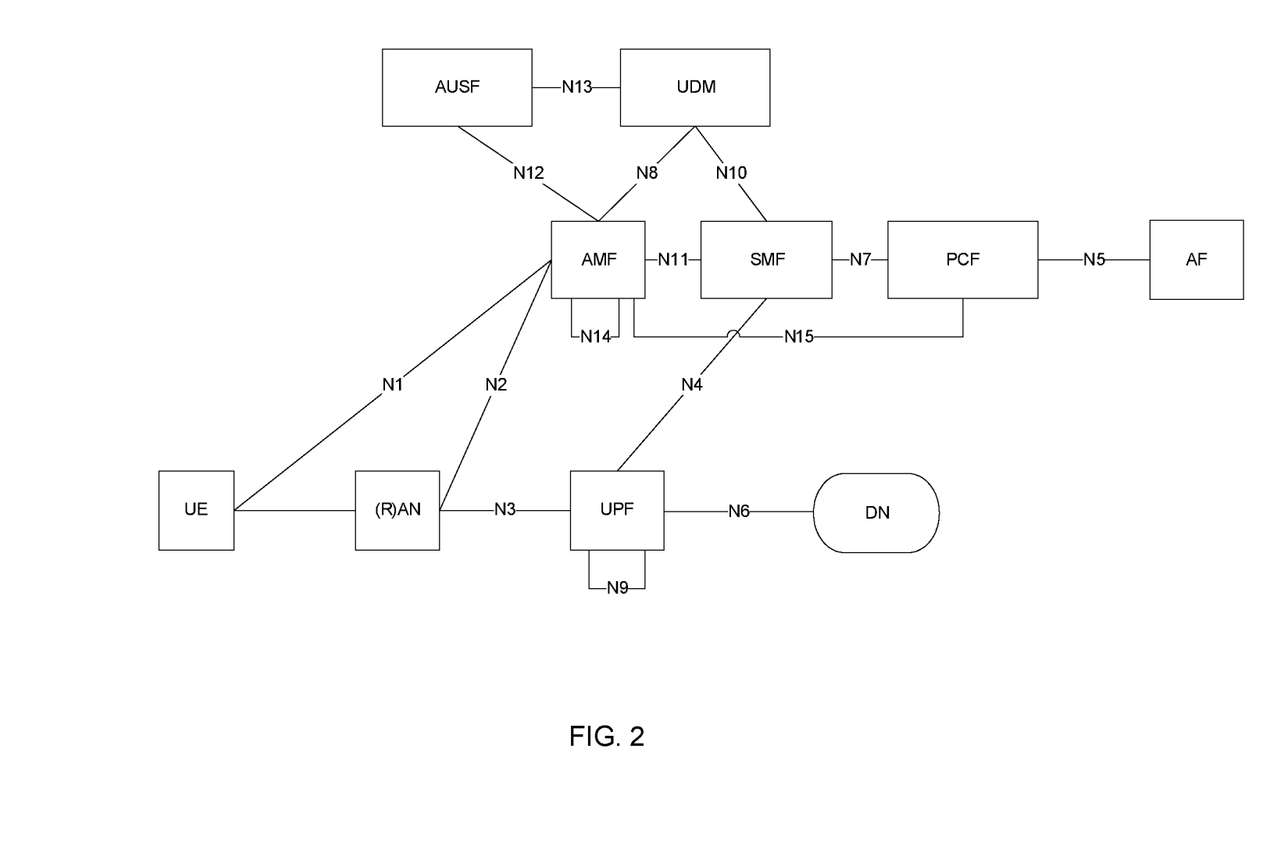
FIG. 2 schematically illustrates the Non-Roaming 5G System Architecture in reference point representation.

In the long term evolution of the telecommunication network including an access network and a core network, the interface (or the reference point) between the access network and the core network is divided into a user plane and a control plane. The user plane can carry the user data and the control plane can carry the control information. For example, in the Evolved Packet System (EPS), a user plane called as S1-U exists between the Evolved Universal Terrestrial Radio Access Network (E-UTRAN) and the Serving Gateway (SGW), as shown in FIG. 1. As another example, in the 5th generation (5G) system, a user plane called as N3 exists between the (R)AN and the User Plane Function (UPF), as shown in FIG. 2.

A user plane path may need to be established in some procedures in the telecommunication network to allow communication of user data. For example, a bearer or a tunnel on the user plane needs to be established in the UE requested PDN connectivity procedure.

Figure 3:
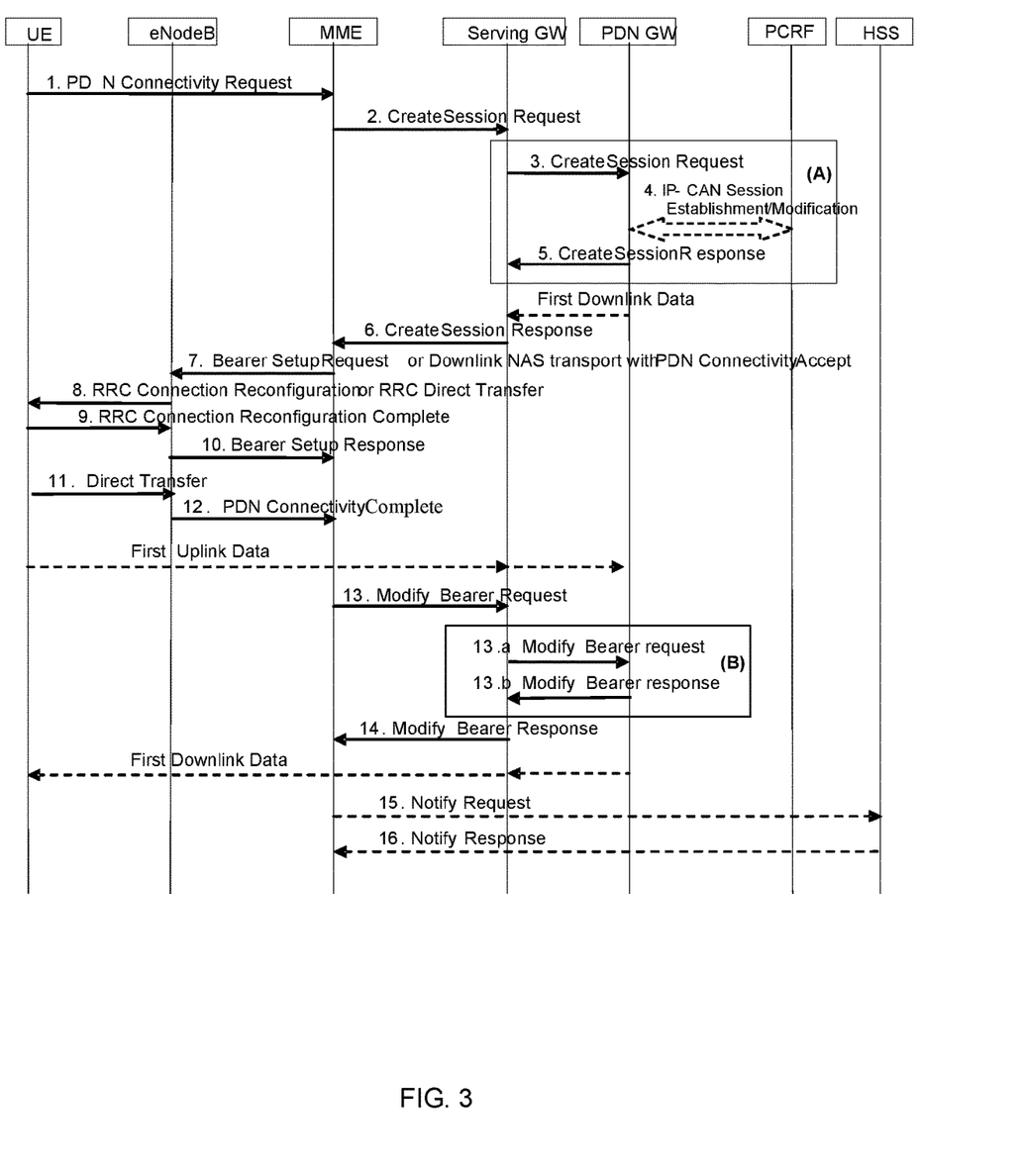
FIG. 3 schematically illustrates the UE requested PDN connectivity procedure for the E-UTRAN.

FIG. 3 illustrates the UE requested PDN connectivity procedure for the E-UTRAN in the EPS. The procedure allows the UE to request for connectivity to an additional PDN over E-UTRAN including allocation of a default bearer. This procedure could be a standalone or as part of initial Attach.

To set up the bearer, in step 7 in FIG. 3, the Mobility Management Entity (MME) sends PDN Connectivity Accept Session Management Request (APN, PDN Type, PDN Address, EPS Bearer Id, Protocol Configuration Options, Header Compression Configuration, Control Plane Only Indicator) message to the UE. If the PDN connection uses the user plane over the radio, this message is contained in an S1_MME control message Bearer Setup Request (EPS Bearer QoS, UE-AMBR, PDN Connectivity Accept, S1-TEID) to the eNodeB. The message includes the TEID at the Serving GW used for user plane and the address of the Serving GW for user plane. And in step 10 in FIG. 3, the eNodeB sends an S1-AP Bearer Setup Response to the MME. The S1-AP message includes the TEID of the eNodeB and the address of the eNodeB used for downlink traffic on the S1-U reference point.

3GPP TS 23.007 prescribes user plane path failure detection and handling for a user plane path. The following are the contents regarding user plane path failure detection and handling in 3GPP TS 23.007:

"20.3 User Plane Path Failure Detection and Handling
20.3.1 General
GTP-U entities shall support detection of path failure by using Echo Request/Echo Response messages in the following way. A path counter shall be reset each time an Echo Response is received on the path and incremented when the T3-RESPONSE timer expires for any Echo Request message sent on the path. The path shall be considered to be down if the counter exceeds N3-REQUESTS.

Upon detecting a path failure, the network node should notify the failure via the Operation and Maintenance system and may either
  delete the bearer contexts associated with the path in failure; or
  maintain the bearer contexts associated with the path in failure during an operator configurable maximum path failure duration. The network node shall delete the maintained resources if the path is still down when this duration expires.

. . .

20.3.4 With Control and User Plane Separation of SGW or PGW Nodes
With a split SGW or PGW (see 3GPP TS 23.214 [42]), user plane path failure detection and handling shall be supported as specified in subclause 20.3.1 with the following additional requirements:
  upon detecting a GTP-U user plane path failure, the SGW-U or PGW-U shall report the user plane path failure to the SGW-C or PGW-C respectively, by sending an Sx Node Report Request (see 3GPP TS 29.244 [43]) including a User Plane Path Failure Report with the IP address of the remote GTP-U peer(s) towards which a failure has been detected;
  upon being notified about the user plane path failure, when deciding to delete the bearer contexts associated with the path in failure, the SGW-C or PGW-C shall modify or delete the affected Sx sessions in the SGW-U or PGW-U".

However, there is a need to improve detection and handling of failure on the user plane path for better communication of user data.

SUMMARY

The inventors of the present disclosure find, in the current mechanisms for user plane path failure detection and handling, the following problems exist (taking the EPS for example):

1) At the user plane path establishment between base station (BS) and SGW, when the BS receives the allocated SGW tunnel info, or when the SGW receives the allocated BS tunnel info, the current standard doesn't specify if the aliveness of the S1-U path should be checked in the endpoint (i.e., the BS and/or SGW). Consequently, the EPS bearer may be set up successfully, but the end user cannot have any service.

Even if such checking may be performed depending on product implementation, the checking result is not passed to MME for further action (e.g. trying alternative path), and consequently the service interruption can be long.

2) After the user plane establishment between BS and SGW, if the BS or SGW performs path management and detects user plane path failure, the endpoint (i.e., the BS or SGW) may delete the EPS bearer immediately or after a configurable time period, however the reason (i.e. user plane path failure) is not informed to the MME, consequently (1) the further attempts of EPS bearer setup will probably fail if the same path is selected, and (2) the alternative alive path may not be selected, resulting in long service interruption.

One of the objectives of the present disclosure is to resolve or alleviate the above problems.

According to an aspect of the present disclosure, the objective is achieved by a method of an endpoint of a user plane path between an access network and a core network in a telecommunication network, comprising: detecting whether a failure exists on the user plane path or not; and notifying a node in the core network of the failure in order for the node to handle the failure, upon detecting the failure.

According to another aspect of the present disclosure, the objective is achieved by an endpoint of a user plane path between an access network and a core network in a telecommunication network, comprising: a detecting unit, for detecting whether a failure exists on the user plane path or not; and a notifying unit, for notifying a node in the core network of the failure in order for the node to handle the failure, upon detecting the failure.

According to still another aspect of the present disclosure, the objective is achieved by an endpoint of a user plane path between an access network and a core network in a telecommunication network, comprising: a processor; and a memory, having stored instructions that when executed by the processor cause the endpoint to perform the above method of the endpoint.

According to a further aspect of the present disclosure, the objective is achieved by a method of a node in a core network in a telecommunication network including the core network and an access network, comprising: receiving a notification regarding a failure on a user plane path between the access network and the core network, from an endpoint of the user plane path; and handling the failure.

According to a another further aspect of the present disclosure, the objective is achieved by a node in a core network in a telecommunication network including the core network and an access network, comprising: a receiving unit, for receiving a notification regarding a failure on a user plane path between the access network and the core network, from an endpoint of the user plane path; and a handling unit, for handling the failure.

According to a still further aspect of the present disclosure, the objective is achieved by a node in a core network in a telecommunication network including the core network and an access network, comprising: a processor; and a memory, having stored instructions that when executed by the processor cause the node to perform the above method of the node.

The solution of the present disclosure has the following advantages:

detecting the aliveness of the user plane path timely for the user plane path setup, thus ensuring the end user's actual accessibility to the services in the packet data network;

allowing reselection of user plane path timely at user plane path failure and minimizing the service interruption.

BRIEF DESCRIPTION OF THE DRAWINGS

The embodiments herein will now be further described in more detail in the following detailed description by reference to the appended drawings illustrating the embodiments and in which.

The elements of the drawings are not necessarily to scale relative to each other. Like numbers refer to like elements throughout the drawings.

DETAILED DESCRIPTION OF EMBODIMENTS

Embodiments herein will be described more fully hereinafter with reference to the accompanying drawings. The embodiments herein may, however, be embodied in many different forms and should not be construed as limiting the scope of the appended claims.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Figure 4:
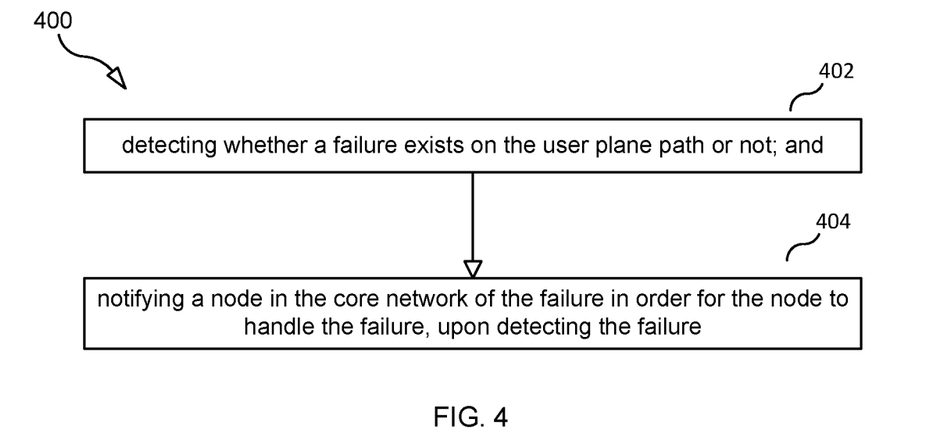
FIG. 4 schematically illustrates a flowchart of the method of the endpoint according to the present disclosure.

A flowchart of a method 400 of the endpoint of the user plane path according to the present disclosure is shown in FIG. 4, and comprises the following steps: step 401 of detecting whether a failure exists on the user plane path or not; and step 402 of notifying a node in the core network of the failure in order for the node to handle the failure, upon detecting the failure.

Figure 5:
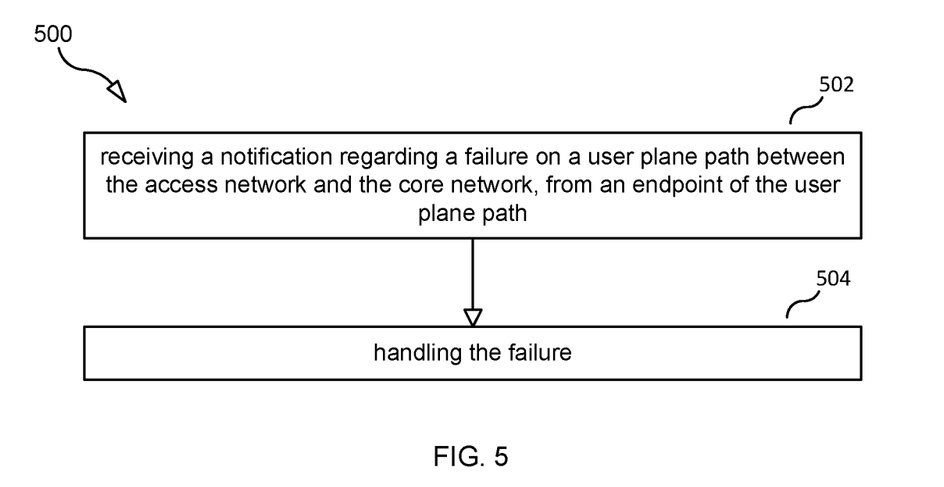
FIG. 5 schematically illustrates a flowchart of the method of the node according to the present disclosure.

A flowchart of a method 500 of the node in the core network according to the present disclosure is shown in FIG. 5, and comprises the following steps: step 501 of receiving a notification regarding a failure on a user plane path between the access network and the core network, from an endpoint of the user plane path; and step 502 of handling the failure.

Both the endpoint and the node can be implemented as a network element on a dedicated hardware, as a firmware or a software instance running on a hardware, as a virtualized function instantiated on an appropriate platform (e.g. on a cloud infrastructure), or as any combination thereof.

Now, further embodiments will be described in connection with the EPS and the 5G system. It can be understood that, although the further embodiments herein are described in the context of the EPS and 5G system, the embodiments can be also applied to other different telecommunication systems, if the same problems exist in their mechanisms for user plane path failure detection and handling. It will be also understood that, although specific terms are used in the embodiments, the embodiments are not limited to those specific terms but may be applied to all similar entities. For example, the term "base station"/"BS" herein may refer to e.g. access point, base station, macro base station, femto base stations, NodeB (NB), eNodeB (eNB), gNodeB (gNB) and so on, and the "user equipment"/"UE" herein may refer to e.g. user terminal, station, terminal, terminal node, and so on.

1. EPS without Control and User Plane Separation (CUPS)

Whether a failure exists on the user plane path or not can be detected by either of the endpoints, i.e., either the BS in the radio access network (RAN) or the SGW, e.g., by using the Echo Request, e.g., when the user plane path is being established by a node in the core network or after the user plane path is established.

1.1 Detecting the Failure by the BS

Figure 6:
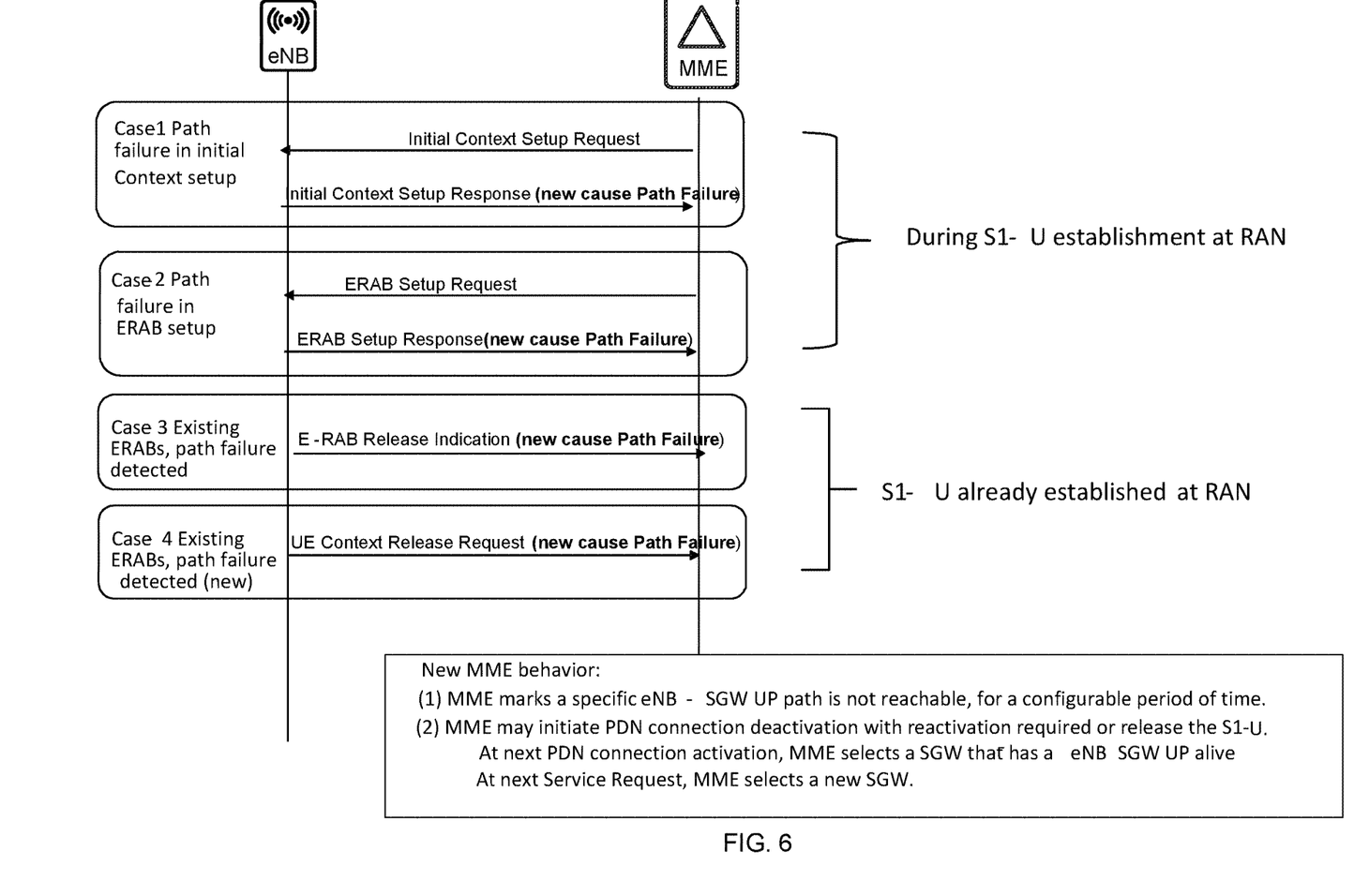
FIG. 6 schematically illustrates an example of detection and handling for user plane path failure in the EPS according to the present disclosure.

The example cases of detecting a failure on the user plane path by the BS are shown in FIG. 6, wherein case-1 and case-2 relate to detecting the failure when the user plane path is being established by the MME, and case-3 and case-4 relate to detecting the failure after the user plane path is established.

Case-1: At Initial Context Setup (e.g. initial Attach, TAU with active flag), when the BS receives the SGW tunnel info e.g., in an Initial Context Setup Request from the MME, the BS detects whether a failure exists on the user plane path towards the SGW. If a failure is detected on the user plane path, the BS fails the procedure and notifies the MME of the user plane path failure, e.g., as the cause in an Initial Context Setup Response.

Case-2: At Evolved Radio Access Bearer (E-RAB) setup (e.g. at UE requested PDN connectivity, dedicated bearer activation), when the BS receives the SGW tunnel info e.g., in an E-RAB Setup Request from the MME, the BS detects whether a failure exists on the user plane path towards the SGW. If a failure is detected on the user plane path, the BS fails the procedure and notifies the MME of the user plane path failure, e.g., as the cause in an E-RAB Setup Response.

Case-3 and Case-4: assuming that the E-RAB is already established and then a user plane path failure between the BS and the SGW is detected by the BS, the BS may notify the MME of the user plane path failure, e.g., as the cause in an E-RAB Release Indication or in a UE Context Release Request.

1.2 Detecting the Failure by the SGW

Figure 7:
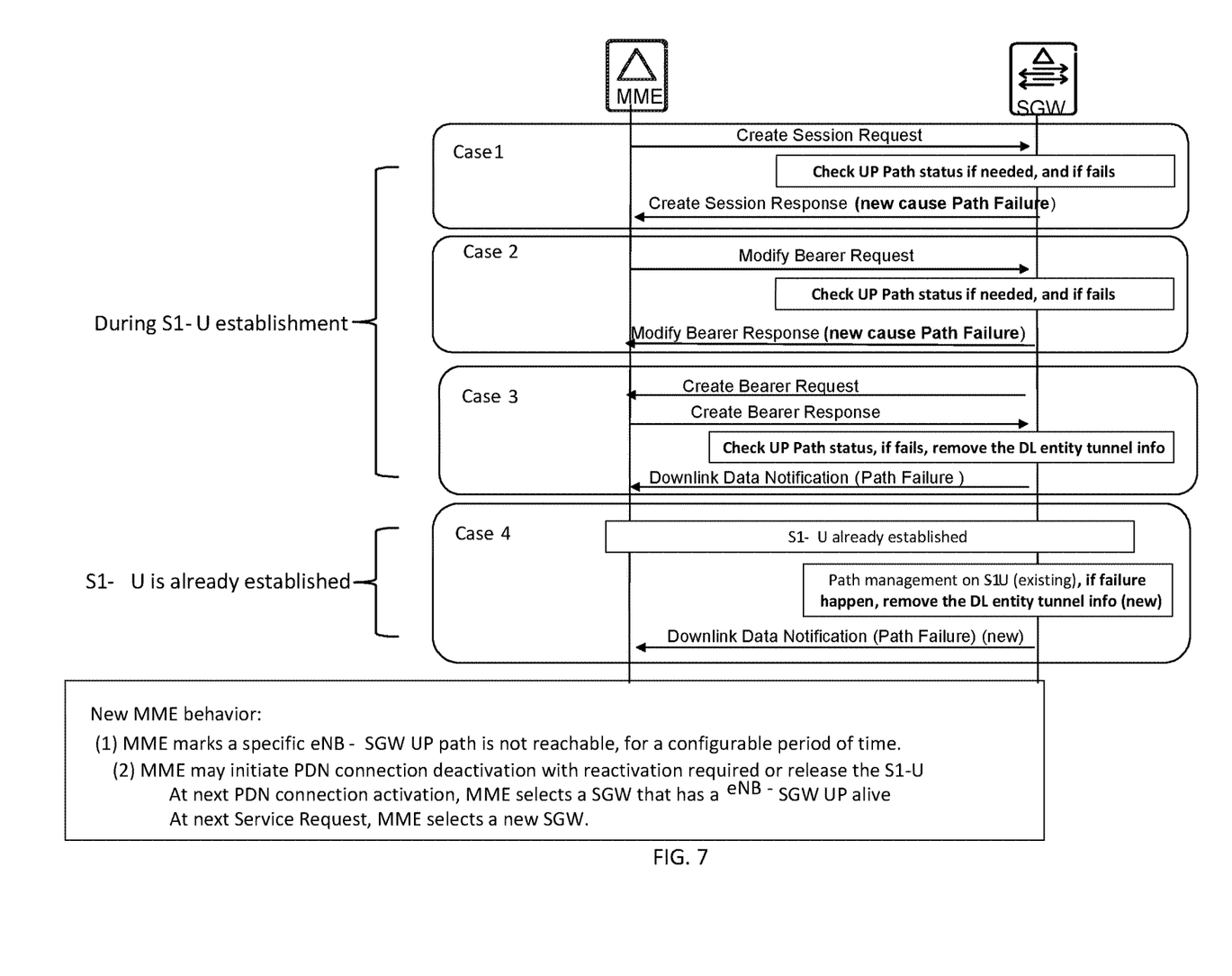
FIG. 7 schematically illustrates another example of detection and handling for user plane path failure in the EPS according to the present disclosure.

FIG. 7 illustrates the example cases of detecting a failure on the user plane path by the SGW, wherein case-1, case-2 and case-3 relate to detecting the failure when the user plane path is being established by the MME, and case-4 relates to detecting the failure after the user plane path is established.

Case-1: At Creation of Session (e.g., for X2-based handover procedure), when the SGW receives the BS tunnel info e.g., in a Create Session Request from the MME, the SGW detects whether a failure exists on the user plane path between the BS and the SGW. If a failure is detected on the user plane path, the SGW fails the procedure and notifies the MME of the user plane path failure, e.g., as the cause in a Create Session Response.

Case-2: At Modification of Bearer (this could involve different procedures, e.g. Initial Attach, Service Request, TAU with active flag, handover and PDN connectivity), when the SGW receives the BS tunnel info e.g., in a Modify Bearer Request from the MME, the SGW detects whether a failure exists on the user plane path between the BS and the SGW. If a failure is detected on the user plane path, the SGW fails the procedure and notifies the MME of the user plane path failure, e.g., as the cause in a Modify Bearer Response.

Case-3: At Creation of Bearer (this is e.g., dedicated bearer activation procedure), when the SGW receives the BS tunnel info e.g., in a Create Bearer Response from the MME, the SGW detects whether a failure exists on the user plane path between the BS and the SGW. If a failure is detected on the user plane path, the SGW removes the BS tunnel info and notifies the MME of the user plane path failure, e.g., as the cause in a Downlink Data Notification (DDN).

Case-4: assuming that the user plane path is already established and then a user plane path failure between the BS and the SGW is detected by the SGW, the SGW may remove the BS tunnel info and notify the MME of the user plane path failure, e.g., as the cause in a DDN.

1.3 Handling the Failure by the MME

When MME receives the notification regarding the user plane path failure from the BS or the SGW, the MME may mark the user plane path as being temporarily unavailable (e.g. unavailable for a configurable period of time), and take this information into consideration when the MME tries to establish the user plane path again. MME can also take the following actions.

The MME may decide to deactivate the PDN connection related to the failed user plane path with Reactivation Required. At next PDN connectivity request, the MME will consider the failed user plane path marked as being temporarily unavailable and select a different SGW within the configurable period of time, even if the S11 control plane path between the MME and the SGW of that user plane path is still active.

MME may also keep the PDN connection related to the failed user plane path but release the S1-AP control plane path between the MME and the BS. At the next Service Request, the MME may select a different SGW with consideration of the user plane path failure.

2. EPS with CUPS

In such a system, whether a failure exists on the user plane path or not can be detected by either of the endpoints, i.e., either the BS in the RAN or the SGW-User plane function (SGW-U), e.g., by using the Echo Request, e.g., when the user plane path is being established by a node in the core network or after the user plane path is established.

2.1 Detecting the Failure by the BS

The example cases of detecting a failure on the user plane path by the BS in the EPS with CUPS are the same as those in the EPS without CUPS, e.g., shown in FIG. 6.

2.2 Detecting the Failure by the SGW-U

Figure 8:
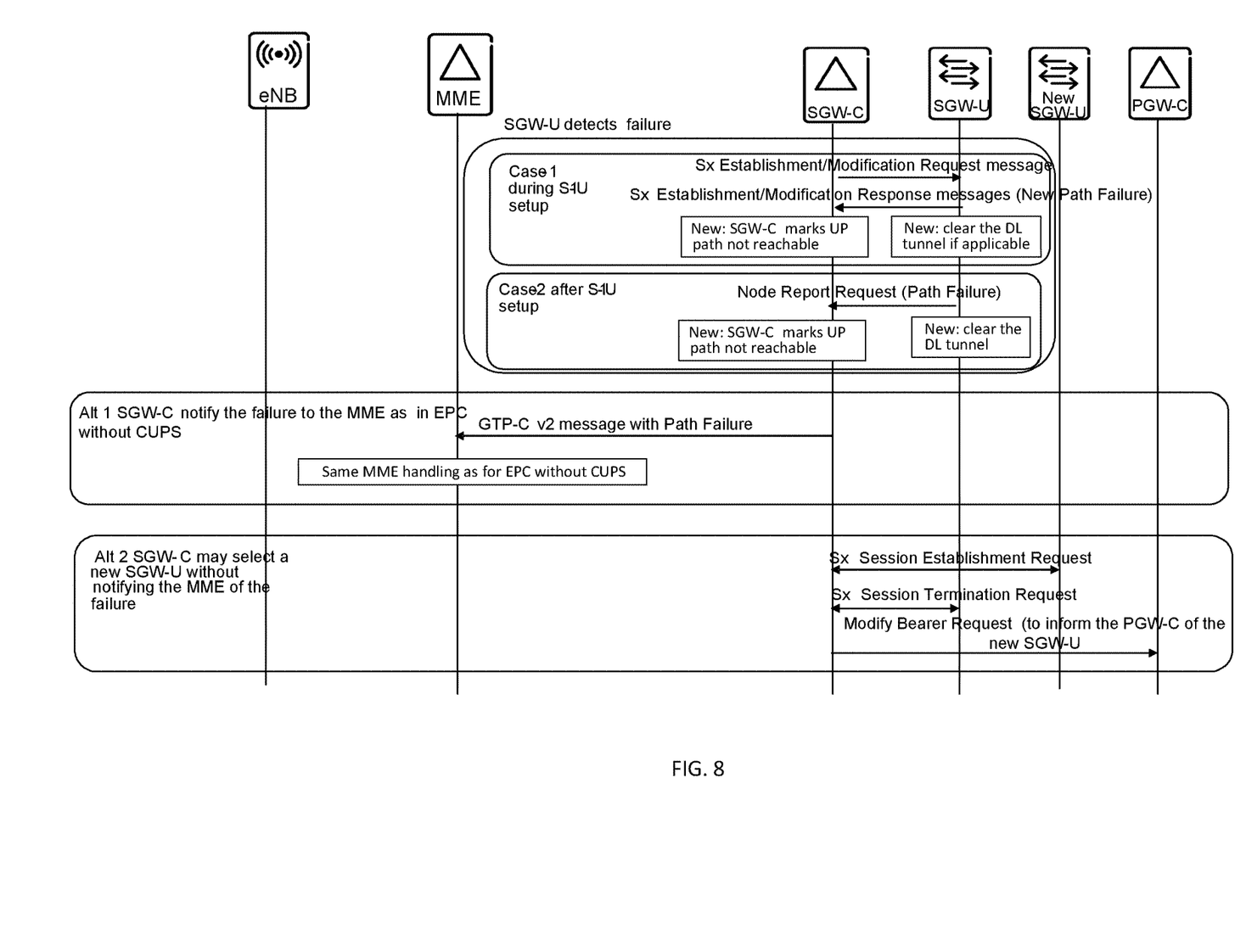
FIG. 8 schematically illustrates a further example of detection and handling for user plane path failure in the EPS according to the present disclosure.

FIG. 8 illustrates the example cases of detecting a failure on the user plane path by the SGW-U, wherein case-1 relates to detecting the failure when the user plane path is being established by a node in the core network, and case-2 relates to detecting the failure after the user plane path is established.

Case-1: The SGW-U can report the user plane failure during the user plane establishment. When the SGW-U receives the BS tunnel info e.g., in a Sx Session Establishment or Modification Request message from the SGW-C, the SGW-U detects whether a failure exists on the user plane path between the BS and the SGW-U. If a failure is detected on the user plane path, the SGW-U fails the procedure and notifies the SGW-C of the user plane path failure, e.g., as the cause in a Sx Session Establishment or Modification Response message.

Case-2: assuming that the user plane path is already established and then a user plane path failure between the BS and the SGW-U is detected by the SGW-U, the SGW-U may remove the BS tunnel info and notify the SGW-C of the user plane path failure, e.g., as the cause in a Node Report Request.

2.3 Handling the Failure by the MME/SGW-C

When the failure is detected by the BS, the BS will notify the MME of the failure, then the MME will handle the failure in the same ways as recited in section 1.3.

When the failure is detected by the SGW-U, the SGW-U will notify the SGW-C of the failure, then the SGW-C may make a decision to report the failure to the MME (meaning the SGW-C considers that the MME needs to reselect a different SGW-C to solve the user plane path failure). The SGW-C can also decide to select a different SGW-U (meaning the SGW-C considers the user plane path failure can be solved by reselecting a different SGW-U). In this case, the SGW-U needs to report the IP address of the other endpoint of the user plane path and interface type (e.g. BS user plane IP address and S1-U interface) to the SGW-C. The reporting info can either be carried in an existing Sx message or a new message.

3. 5G System

The 5G system considers the user plane failure handing should be transparent to the Access and Mobility Management Function (AMF). The user plane path failure shall be handled by the Session Management Function (SMF).

3.1 Detecting the Failure by the BS

Figure 9:
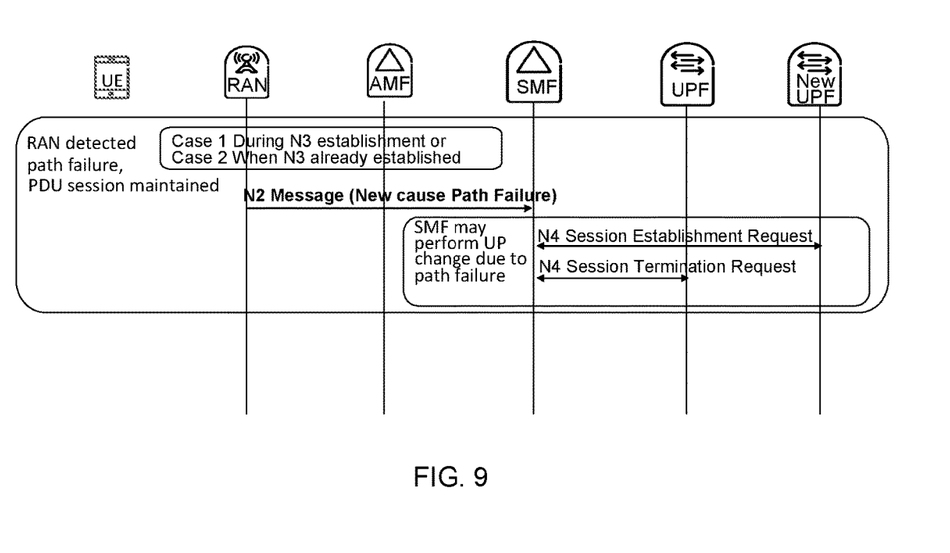
FIG. 9 schematically illustrates an example of detection and handling for user plane path failure in the 5G system according to the present disclosure.

The example cases of detecting a failure on the user plane path by the BS are illustrated in FIG. 9.

Case-1: This case relates to detecting the failure when the user plane path is being established by the SMF. For example, during establishment of a N3 tunnel, if the BS detects a failure exists on the user plane path, the BS fails the procedure and notifies the SMF of the user plane path failure, e.g., as the cause in a N2 message.

Case-2: This case relates to detecting the failure after the user plane path is established. For example, after the N3 tunnel is already established, if the BS detects a failure exists on the user plane path, the BS may notify the SMF of the user plane path failure, e.g., as the cause in a N2 message.

3.2 Detecting the Failure by the User Plane Function (UPF)

Figure 10:
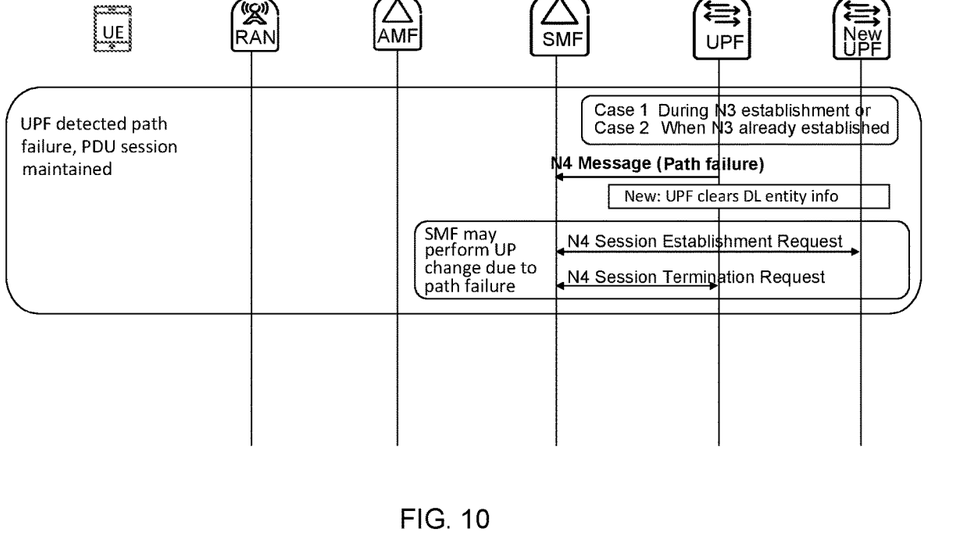
FIG. 10 schematically illustrates another example of detection and handling for user plane path failure in the 5G system according to the present disclosure.

The example cases of detecting the failure by the UPF are illustrated in FIG. 10.

Case-1: This case relates to detecting the failure when the user plane path is being established by the SMF. For example, during establishment of a N3 tunnel, if the UPF detects a failure exists on the user plane path, the UPF fails the procedure and notifies the UPF of the user plane path failure, e.g., in a N4 Response message.

Case-2: This case relates to detecting the failure after the user plane path is established. For example, after the N3 tunnel is already established, if the UPF detects a failure exists on the user plane path, the UPF may notify the SMF of the user plane path failure, e.g., in a N4 Request message.

3.3 Handling the Failure by the SMF

The SMF marks the user plane path as being temporarily unavailable and may perform UPF reselection based on this marking.

If the SMF considers reselection of UPF will not resolve the path failure problem, it can also release the PDU session and indicate the path failure to the AMF. The AMF may take this path failure into consideration for SMF selection during the next PDU session establishment.

Figure 11:
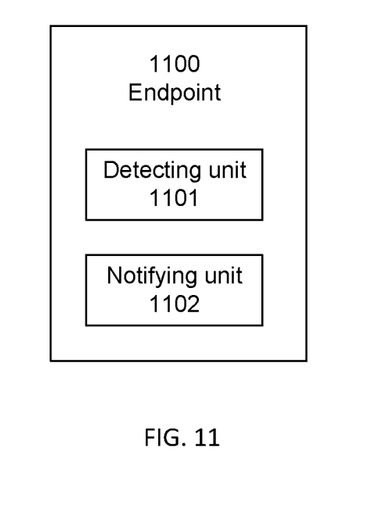
FIG. 11 is a schematic block diagram of the endpoint of the present disclosure.

FIG. 11 is a schematic block diagram of an endpoint 1100 of a user plane path between an access network and a core network in a telecommunication network according to the present disclosure. The endpoint 1100 includes a detecting unit 1101 for detecting whether a failure exists on the user plane path or not; and a notifying unit 1102 for notifying a node in the core network of the failure in order for the node to handle the failure, upon detecting the failure.

Figure 12:
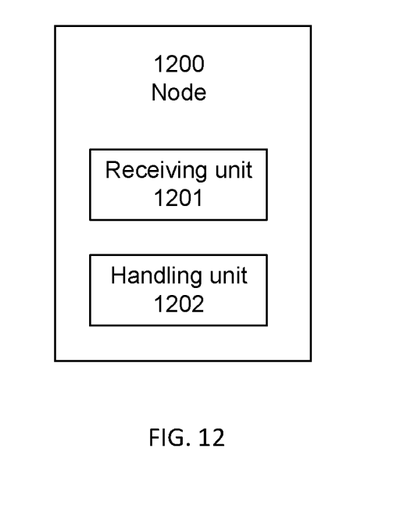
FIG. 12 is a schematic block diagram of the node of the present disclosure.

FIG. 12 is a schematic block diagram of a node 1200 in core network in a telecommunication network including the core network and an access network according to the present disclosure. The node 1200 includes a receiving unit 1201 for receiving a notification regarding a failure on a user plane path between the access network and the core network, from an endpoint of the user plane path; and a handling unit 1202 for handling the failure.

It can be appreciated that, the endpoint 1100 and the node 1200 described herein may be implemented by various units, so that each of the endpoint 1100 and the node 1200 implementing one or more functions described with the embodiments may comprise not only the units shown in the figure, but also other units for implementing one or more functions thereof. In addition, each of the endpoint 1100 and the node 1200 may comprise a single unit configured to perform two or more functions, or separate units for each separate function. Moreover, the units may be implemented in hardware, firmware, software, or any combination thereof.

It is understood that blocks of the block diagrams and/or flowchart illustrations, and combinations of blocks in the block diagrams and/or flowchart illustrations, may be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Furthermore, the solution of the present disclosure may take the form of a computer program on a memory having computer-usable or computer-readable program code embodied in the medium for use by or in connection with an instruction execution system. In the context of this document, a memory may be any medium that may contain, store, or is adapted to communicate the program for use by or in connection with the instruction execution system, apparatus, or device.

Figure 13:
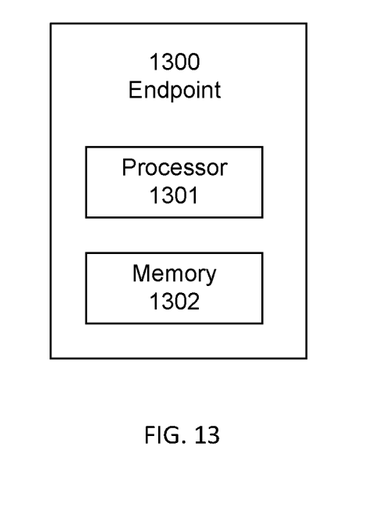
FIG. 13 is another schematic block diagram of the endpoint of the present disclosure.
Figure 14:
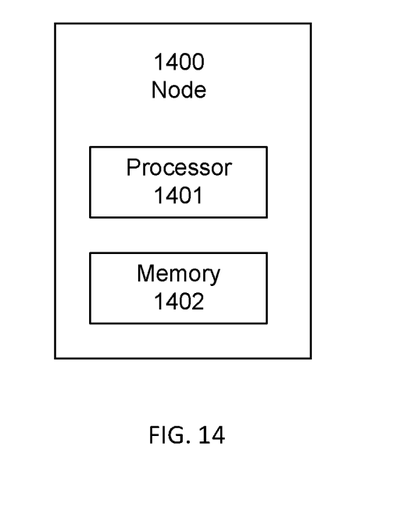
FIG. 14 is another schematic block diagram of the node of the present disclosure.

Therefore, the present disclosure also provides an endpoint 1300 including a processor 1301 and a memory 1302, as shown in FIG. 13. In the endpoint 1300, the memory 1302 stores instructions that when executed by the processor 1301 cause the endpoint 1300 to perform the method of endpoint described above with the embodiments. The present disclosure also provides a node 1400 including a processor 1401 and a memory 1402, as shown in FIG. 14. In the node 1400, the memory 1402 stores instructions that when executed by the processor 1401 cause the node 1400 to perform the method of node described above with the embodiments.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

ABBREVIATIONS

BS base station
EPS Evolved Packet System
E-UTRAN Evolved Universal Terrestrial Radio Access Network
SGW Serving Gateway
SGW-U SGW User plane function
SGW-C SGW Control plane function
(R)AN Radio Access Network
UPF User Plane Function
MME Mobility Management Entity
AMF Access and Mobility Management Function
SMF Session Management Function
UE User Equipment
PDN Packet Data network
E-RAB Evolved Radio Access Bearer

The invention claimed is:

1. A method for handling of a failure of a user plane path between an access network and a core network in a telecommunication network, comprising:
    receiving, by a Mobility Management Entity (MME) in the core network and from a first endpoint of a user plane path, a notification regarding a failure on the user plane path between the access network and the core network;
    handling, by the MME, the failure on the user plane path, wherein the handling comprises:
        marking the user plane path as being temporarily unavailable; and
        attempting to re-establish the user plane path based on the user plane path being marked temporarily unavailable;
    wherein the first endpoint is one of a base station (BS) and a Serving Gateway (SGW); and
    wherein a second endpoint of the user plane path is the other of the BS and the SGW.

2. The method of claim 1, wherein the first endpoint is a SGW user plane function (SGW-U) configured to notify a SGW control plane function (SGW-C) of the failure, the method further comprising receiving, by the MME, the notification regarding the failure from the SGW-C.

3. The method of claim 1, further comprising the MME:
    deactivating a Packet Data Network (PDN) connection related to the user plane path; or
    maintaining the PDN connection while releasing a control plane path between the BS and the MME.

4. The method of claim 1, wherein the handling comprises selecting, by the MME, a different SGW, SGW-U, or SGW-C.

5. The method of claim 1, wherein the receiving comprises the MME receiving the notification regarding the failure responsive to the first endpoint detecting the failure on the user plane path.

6. The method of claim 5, wherein the MME receives the notification regarding the failure on the user plane path responsive to the first endpoint detecting the failure when the user plane path is being established by the MME or after the user plane path is established.

7. A Mobility Management Entity (MME) in a core network in a telecommunication network, comprising:
    processing circuitry; and
    a memory comprising stored instructions that, when executed by the processing circuitry, cause the MME to:
        receive, from a first endpoint of a user plane path, a notification regarding a failure on a user plane path between the access network and the core network;
        handle the failure on the user plane path, wherein the handling comprises:
            mark the user plane path as being temporarily unavailable; and
            attempt to re-establish the user plane path based on the user plane path being marked temporarily unavailable;
        wherein the first endpoint is one of a base station (BS) and a Serving Gateway (SGW); and
        wherein a second endpoint of the user plane path is the other of the BS and the SGW.

8. The MME of claim 7, wherein the first endpoint is a SGW user plane function (SGW-U) configured to notify a SGW control plane function (SGW-C) of the failure, and wherein the stored instructions, when executed by the processing circuitry, further cause the MME to receive the notification regarding the failure from the SGW-C.

9. The MME of claim 7, wherein the stored instructions, when executed by the processing circuitry, further cause the MME to:
deactivate a Packet Data Network (PDN) connection related to the user plane path; or
maintain the PDN connection while releasing a control plane path between the BS and the MME.

10. The MME of claim 7, wherein to handle the failure on the user plane path, the stored instructions, when executed by the processing circuitry, further cause the MME to select a different SGW, SGW-U, or SGW-C.

11. The MME of claim 7, wherein the notification regarding the failure on the user plane path is received responsive to the first endpoint detecting the failure on the user plane path.

12. The MME of claim 11, wherein the notification regarding the failure on the user plane path is received responsive to the first endpoint detecting the failure when the user plane path is being established by the MME or after the user plane path is established.

13. A telecommunication network comprising:
a Mobility Management Entity (MME) in a core network in a telecommunication network, the MME being configured to:
receive, from a first endpoint of a user plane path between an access network and a core network in a telecommunication network, a notification regarding a failure on the user plane path;
handle the failure on the user plane path, wherein the handling comprises:
marking the user plane path as being temporarily unavailable; and
attempting to re-establish the user plane path based on the user plane path being marked temporarily unavailable; and
the first endpoint of the user plane path, the first endpoint comprising:
processing circuitry; and
a memory comprising stored instructions that, when executed by the processing circuitry, cause the first endpoint to:
detect the failure on the user plane path; and
send the notification regarding the failure on the user plane path to the MME responsive to detecting the failure on the user plane path;
wherein the first endpoint is one of a base station (BS) and a Serving Gateway (SGW); and
wherein a second endpoint of the user plane path is the other of the BS and the SGW.

14. The telecommunication network of claim 13, wherein the first endpoint is a SGW user plane function (SGW-U) configured to notify a SGW control plane function (SGW-C) of the failure, and wherein the MME is configured to receive the notification regarding the failure from the SGW-C.

15. The telecommunication network of claim 13, wherein the MME is further configured to:
deactivate a Packet Data Network (PDN) connection related to the user plane path; or
maintain the PDN connection while releasing a control plane path between the BS and the MME.

16. The telecommunication network of claim 13, wherein to handle the failure on the user plane path, the MME is configured to select a different SGW, SGW-U, or SGW-C.

17. The telecommunication network of claim 13, wherein the first endpoint is configured to detect the failure on the user plane path when the user plane path is being established by the MME or after the user plane path is established.

\* \* \* \* \*